United States Patent
Bhatt

(10) Patent No.: US 9,934,287 B1
(45) Date of Patent: Apr. 3, 2018

(54) SYSTEMS AND METHODS FOR EXPEDITED LARGE FILE PROCESSING

(71) Applicant: CAPITAL ONE SERVICES, LLC, McLean, VA (US)

(72) Inventor: Japan Bhatt, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/659,143

(22) Filed: Jul. 25, 2017

(51) Int. Cl.
*G06F 17/30* (2006.01)

(52) U.S. Cl.
CPC .. *G06F 17/30533* (2013.01); *G06F 17/30598* (2013.01)

(58) Field of Classification Search
CPC ............... G06F 17/30533; G06F 17/30598
USPC .......................................................... 707/737
See application file for complete search history.

(56) References Cited

U.S. PATENT DOCUMENTS

| | | | | |
|---|---|---|---|---|
| 5,625,815 A * | 4/1997 | Maier | ............... | G06F 17/30595 |
| 5,837,983 A * | 11/1998 | Actis | ....................... | G06K 7/14 235/383 |
| 5,897,638 A * | 4/1999 | Lasser | ............... | G06F 17/30171 |
| 6,115,705 A * | 9/2000 | Larson | ............... | G06F 17/30489 |
| 6,173,415 B1 * | 1/2001 | Litwin | ............... | G06F 11/1076 711/114 |
| 6,230,164 B1 * | 5/2001 | Rekieta | ............... | H04Q 3/0029 707/624 |
| 6,367,070 B1 * | 4/2002 | Haghighat | ............... | G06F 8/452 717/143 |
| 6,381,601 B1 * | 4/2002 | Fujiwara | ............ | G06F 17/30489 707/692 |
| 7,403,942 B1 * | 7/2008 | Bayliss | ............. | G06F 17/30303 707/748 |
| 7,590,620 B1 * | 9/2009 | Pike | ...................... | G06F 11/1482 |
| 7,657,540 B1 * | 2/2010 | Bayliss | ............. | G06F 17/30592 707/609 |
| 8,040,552 B2 * | 10/2011 | Yanagita | .................. | G06T 11/60 345/619 |
| 8,234,250 B1 * | 7/2012 | Sharma | ............... | G06F 17/3015 707/649 |
| 8,538,123 B1 * | 9/2013 | Csulits | ............... | G07D 11/0066 235/379 |
| 8,600,994 B1 * | 12/2013 | Xu | ..................... | G06F 17/30498 707/737 |
| 8,645,399 B2 * | 2/2014 | McNeill | ............ | G06F 17/30303 375/240.24 |
| 8,719,270 B2 * | 5/2014 | Agarwal | ............. | G06F 17/2247 707/737 |

(Continued)

*Primary Examiner* — Phuong Thao Cao

(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method for processing a large file. The system may receive record data comprising a plurality of records having an identification value in a common field having a data format. The system may determine a plurality of focus values based on the data format and create a plurality of virtual processing units based on the plurality of focus values. Each of the plurality of virtual processing units may process a sub-group of the plurality of records that corresponds to the focus value associated with the respective virtual processing unit.

3 Claims, 5 Drawing Sheets

(56) References Cited

U.S. PATENT DOCUMENTS

| | | | |
|---|---|---|---|
| 8,812,564 B2* | 8/2014 | Peh | G06F 17/30584 707/737 |
| 8,929,640 B1* | 1/2015 | Mennie | G06K 9/00469 382/135 |
| 9,336,024 B1* | 5/2016 | Beda, III | G06F 9/455 |
| 9,817,700 B2* | 11/2017 | Caufield | G06F 9/505 |
| 2003/0037049 A1* | 2/2003 | Weigelt | G06F 9/5016 |
| 2003/0115206 A1* | 6/2003 | Gilbert | G06F 17/30339 |
| 2004/0220929 A1* | 11/2004 | Rozeboom | G06F 17/30339 |
| 2005/0049996 A1* | 3/2005 | Srinivasan | G06F 17/30917 |
| 2005/0102325 A1* | 5/2005 | Gould | G06F 17/30466 |
| 2005/0234913 A1* | 10/2005 | Carone | G06Q 40/02 |
| 2006/0230400 A1* | 10/2006 | Armstrong | G06F 9/5077 718/1 |
| 2007/0022137 A1* | 1/2007 | Scarboro | G06F 17/30525 |
| 2008/0172402 A1* | 7/2008 | Birdwell | G06F 17/30327 |
| 2008/0313189 A1* | 12/2008 | Mehta | G06F 17/30445 |
| 2009/0164471 A1* | 6/2009 | Shen | G06F 17/30584 |
| 2009/0182970 A1* | 7/2009 | Battista | G06F 9/5077 711/173 |
| 2009/0276477 A1* | 11/2009 | Thuringer | G06F 17/30312 |
| 2009/0307229 A1* | 12/2009 | Kunti | G06F 17/30914 |
| 2010/0011019 A1* | 1/2010 | Scarboro | G06F 17/30525 707/E17.009 |
| 2010/0106724 A1* | 4/2010 | Anderson | G06N 99/005 707/737 |
| 2010/0223261 A1* | 9/2010 | Sarkar | G06F 17/30705 707/726 |
| 2010/0281027 A1* | 11/2010 | Duan | G06F 17/30584 707/737 |
| 2010/0306854 A1* | 12/2010 | Neergaard | G06F 21/6254 726/26 |
| 2011/0040810 A1* | 2/2011 | Kaplan | G06F 17/3007 707/822 |
| 2011/0225215 A1* | 9/2011 | Ukai | G06F 17/302 707/821 |
| 2011/0252275 A1* | 10/2011 | Gudlavenkatasiva | G06F 11/0793 714/15 |
| 2012/0239558 A1* | 9/2012 | Zhang | G06Q 40/00 705/39 |
| 2013/0067025 A1* | 3/2013 | Vasters | H04N 21/252 709/217 |
| 2013/0086135 A1* | 4/2013 | Kaplan | G06F 17/3007 707/827 |
| 2013/0124474 A1* | 5/2013 | Anderson | G06F 17/30286 707/634 |
| 2013/0124525 A1* | 5/2013 | Anderson | G06F 17/30286 707/737 |
| 2013/0124585 A1* | 5/2013 | Suzuki | G06F 11/1076 707/822 |
| 2013/0166568 A1* | 6/2013 | Binkert | G06F 17/30911 707/741 |
| 2013/0166589 A1* | 6/2013 | Baeumges | G06F 17/30486 707/769 |
| 2013/0173560 A1* | 7/2013 | McNeill | G06F 17/30303 707/692 |
| 2013/0205028 A1* | 8/2013 | Crockett | G06F 9/5027 709/226 |
| 2013/0297788 A1* | 11/2013 | Itoh | H04L 43/0876 709/224 |
| 2013/0325915 A1* | 12/2013 | Ukai | G06F 17/30194 707/827 |
| 2014/0059000 A1* | 2/2014 | Hosouchi | G06F 17/30289 707/609 |
| 2014/0082053 A1* | 3/2014 | Chen | H04L 67/10 709/203 |
| 2014/0101178 A1* | 4/2014 | Ginter | G06F 17/30979 707/755 |
| 2014/0207820 A1* | 7/2014 | Lee | G06F 17/30539 707/776 |
| 2014/0236951 A1* | 8/2014 | Taycher | G06F 17/30011 707/738 |
| 2014/0279704 A1* | 9/2014 | Vicari | G06Q 40/06 705/36 R |
| 2014/0279992 A1* | 9/2014 | Morozov | G06F 17/30303 707/706 |
| 2014/0324861 A1* | 10/2014 | Ray | G06F 17/30442 707/737 |
| 2014/0330785 A1* | 11/2014 | Isherwood | G06F 11/1446 707/640 |
| 2015/0066992 A1* | 3/2015 | Tomarkin | G06F 17/30289 707/803 |
| 2015/0095351 A1* | 4/2015 | Balikov | G06F 17/30312 707/752 |
| 2015/0100592 A1* | 4/2015 | Balikov | G06F 9/5066 707/752 |
| 2015/0149503 A1* | 5/2015 | Wollrath | G06F 17/30194 707/770 |
| 2015/0169622 A1* | 6/2015 | Pingry | G06F 17/30424 707/736 |
| 2015/0172369 A1* | 6/2015 | Surendran | H04L 67/06 709/201 |
| 2015/0220579 A1* | 8/2015 | Gaur | G06F 17/30292 707/745 |
| 2015/0254264 A1* | 9/2015 | Yu | G06F 11/1469 707/674 |
| 2015/0293980 A1* | 10/2015 | Dola | G06F 17/30563 726/26 |
| 2015/0347549 A1* | 12/2015 | Chang | G06F 17/30575 707/610 |
| 2016/0012075 A1* | 1/2016 | Ukai | G06F 17/30132 707/827 |
| 2016/0034527 A1* | 2/2016 | Barber | G06F 17/30486 707/693 |
| 2016/0063042 A1* | 3/2016 | Noma | G06F 17/30321 707/737 |
| 2016/0070721 A1* | 3/2016 | Menendez | G06F 17/30224 707/823 |
| 2016/0092452 A1* | 3/2016 | Wang | G06K 9/00785 707/752 |
| 2016/0092552 A1* | 3/2016 | Morfonios | G06F 17/30091 707/737 |
| 2016/0117393 A1* | 4/2016 | Von Rickenbach | G06F 17/30864 707/723 |
| 2016/0171072 A1* | 6/2016 | Jagtiani | G06F 17/30339 707/613 |
| 2016/0292221 A1* | 10/2016 | Clarke | G06F 17/30454 |
| 2016/0366575 A1* | 12/2016 | Golec | H04M 15/41 |
| 2016/0378752 A1* | 12/2016 | Anderson | G06F 17/30424 707/747 |
| 2017/0147674 A1* | 5/2017 | Procops | G06F 17/30106 |
| 2017/0161326 A1* | 6/2017 | Anderson | G06F 17/30466 |
| 2017/0199896 A1* | 7/2017 | Sharma | G06F 17/30179 |
| 2017/0206208 A1* | 7/2017 | Zhang | G06F 17/30079 |
| 2017/0206256 A1* | 7/2017 | Tsirogiannis | G06F 17/30563 |
| 2017/0242904 A1* | 8/2017 | Hattori | G06F 17/30306 |

* cited by examiner

SYSTEMS AND METHODS FOR EXPEDITED LARGE FILE PROCESSING

FIELD OF INVENTION

The present disclosure relates to systems and methods for expedited large file processing, and more particularly for dynamically creating a number of virtual processing units to perform parallel processing of one or more large data files based on associated focus values.

BACKGROUND

Businesses often store, access, use, and provide access to very large data files, such as files containing numerous records relating to customer information, vendor information, or employee information, as part of their business operations. From time to time, large files such as these require processing to implement a global change such as, for example, adding a new field such as a new type of account number or employee ID number to each and every record of the file. Processing such large files by conventional methods, such as processing each record in serial by a single processor, can be extremely time-consuming. The amount of time a single processor would take would be further increased if a processing error occurred, such that the entire file may have to be reprocessed again. To reduce processing time, some businesses rely on parallel processing techniques involving multiple processors operating simultaneously. However, utilizing multiple processors to perform parallel processing requires additional overhead in the form of additional infrastructure that needs to be acquired, setup, and maintained.

Accordingly, there is a need for improved systems and methods to process large files quickly, simply, and efficiently. Embodiments of the present disclosure are directed to this and other considerations.

SUMMARY

Disclosed embodiments provide systems and methods for improved processing of large files.

Consistent with the disclosed embodiments, the system may include one or more memory devices storing instructions, and one or more processors configured to execute the instructions to perform steps of a method to process a large file. The system may execute the instructions to receive record data comprising a plurality of records, where each of the plurality of records may comprise an identification value in a common field having a data format. The system may determine a plurality of focus values based on the data format, where each of the plurality of focus values is unique and corresponds to a sub-group of the plurality of records. The system may create a plurality of virtual processing units that are each associated with a unique one of the plurality of focus values. The system may process, by each of the plurality of virtual processing units, the respective sub-group of the plurality of records that corresponds to the focus value associated with the respective virtual processing unit in response to searching the record data.

Consistent with the disclosed embodiments, methods for processing large files are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
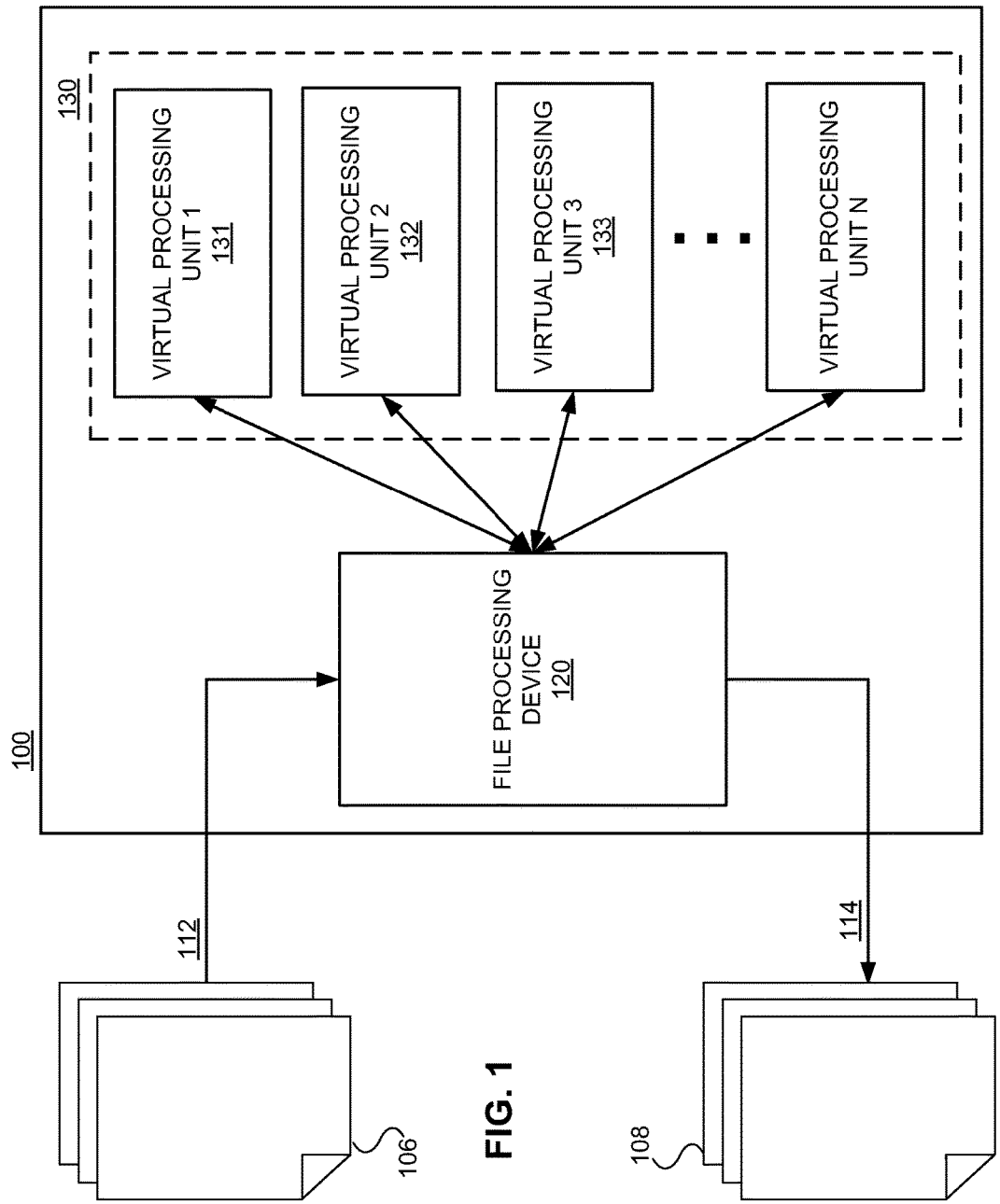
FIG. 1 is a work flow diagram of an exemplary large file processing system.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, "common field" may refer to a data record field that is common to a plurality of data records. For example, a plurality of records may all have a "social security number field" which is designed to store a social security number associated with the record.

As used herein, "identification value" may refer to the data stored or input into a common field of a record. For example, if the common field is a social security number field, an identification value may be the particular social security number that is stored or entered into the social security number field of a particular record.

As used herein, "data type" may refer to a set of possible data entries that may be input or stored at one or more particular character positions of a data format. For example, data types may include numbers, integers, letters, alphanumeric characters, binary numbers, base ten numbers, ASCII values, hexadecimal values, or any other predefined set of values, characters, and/or symbols that may be store in a field of a record.

As used herein, "data format" may refer to a predefined sequence of a specified number of character positions, wherein each character position has an associated data type. For example, a "license plate data format" may be a sequence of seven character positions, wherein the first three character positions have a letter data type (i.e., each of the first three characters of the license plate data format must be a letter) and the last four character positions have a number data type (i.e., each of the last four characters of the license plate data format must be a number). Thus, an identification value in a field associated with a license plate data format may be required to be sequence of seven characters, where the first three characters are letters and the last four characters are numbers.

As used herein, "character position" or "character" may refer to a position within a predefined sequence, such as a predefined sequence of a data format. For example, as described above, a license plate data format may be a sequence of seven characters and an example of an identification value adhering to the license plate data format may be "ABC1234." In this example, the "A" may be said to be at the first character position, the "B" is at the second character position, and so on through the "4" which may be said to be at the seventh character position.

As used herein, "seed portion" may refer to a selected portion of a data format to be used in generating an associated plurality of focus values. For example, a seed portion may refer to a selected one or more character positions of a data format that may be used to generate an associated plurality of focus values based on the data type(s) associated with the selected character position(s).

As used herein, "focus value" may refer to one of the plurality of possible values that would satisfy the seed portion. The "plurality of focus values" may refer to the plurality of values that would satisfy all possible permutations of the seed portion. For example, if the seed portion of a license plate data format as described above were selected to be the first and seventh value of the data format which may be associated with the letter data type and number data type respectively, then the plurality of focus values associated with this seed portion would be every possible letter-number combination (i.e., A-0, A-1, A-2, . . . Z-7, Z-8, Z-9). Thus, in this example the plurality of focus values would be 260 unique letter-number combinations.

As used herein, "virtual processing unit" may refer to a virtual machine or container that may be configured to process a portion of a large file that corresponds to a particular focus value that is associated with the virtual processing unit. According to some embodiments, virtual processing units may be dynamically created and deleted.

As used herein, "container" may refer to a Linux container, which may relate to an operating-system-level virtualization method for running multiple isolated Linux systems (i.e., containers) on a control host using a single Linux kernel.

The disclosed embodiments are directed to systems and methods for processing a large file. The system may include one or more memory devices storing instructions, and one or more processors configured to execute the instructions to perform steps of a method. Specifically, in some embodiments, the system may execute the instructions to receive record data comprising a plurality of records, where each of the plurality of records may comprise an identification value in a common field having a data format. The system may determine a plurality of focus values based on the data format, where each of the plurality of focus values is unique and corresponds to a sub-group of the plurality of records. The system may create a plurality of virtual processing units that are each associated with a unique one of the plurality of focus values. The system may process, by each of the plurality of virtual processing units, the respective sub-group of the plurality of records that corresponds to the focus value associated with the respective virtual processing unit in response to searching the record data In one embodiment, a system for processing a large file is disclosed. The system may include one or more processors, associated with one or more memories, which processors execute the instructions to receive record data comprising a plurality of records, where each of the plurality of records may comprise an identification value in a common field having a data format. The system may determine a plurality of focus values comprising at least a first focus value and a second focus value based on the data format. Each of the plurality of focus values may correspond to a sub-group of the plurality of records such that the first focus value may correspond to a first sub-group of the plurality of records and the second focus value may correspond to a second sub-group of the plurality of records. The system may create a first virtual processing unit for processing the first sub-group of the plurality of records corresponding to the first focus value and a second virtual processing unit for processing the second sub-group of the plurality of records corresponding to the second focus value. The system may process the first and second sub-groups of the plurality of records via the first and second virtual processing units, respectively.

In another embodiment, a method for processing a large file is disclosed. The method may include receiving record data comprising a plurality of records, where each of the plurality of records may comprise an identification value in a common field having a data format. The method may include determining a plurality of focus values based on the data format, where each of the plurality of focus values is unique and corresponds to a sub-group of the plurality of records. The method may further include creating a plurality of virtual processing units that are each associated with a unique one of the plurality of focus values. The method may further include processing, by each of the plurality of virtual processing units, the respective sub-group of the plurality of records that corresponds to the focus value associated with the respective virtual processing unit in response to searching the record data.

Although some of the above embodiments are described with respect to systems, it is contemplated that embodiments with identical or substantially similar features may alternatively be implemented as methods and/or non-transitory computer-readable media, and vice versa.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary large file processing system 100 that may be used to perform one or more processes that may process a large file. The components and arrangements shown in FIG. 1 are not intended to limit the disclosed embodiments as the components used to implement the disclosed processes and features may vary. As shown, system 100 may include a file processing device 120 that may create a plurality of virtual processing units 130 that may process a file or portions of a file. In some embodiments, file processing device 120 may read or receive 112 a large input file 106, process the large input file 106 via a plurality of virtual processing units 130, and may write or output 114 an output file 108. According to some embodiments, a file processing device 120 may process a large input file 106 by, for example, adding, deleting, transforming, or modifying data to one or more data records of the large input file 106. Large input file 106 and/or output file 108 may be stored in any file-based system or database. In some embodiments, large input file 106 and/or output file 108 may be stored by an external storage device, such as, for example, an external database, computing device, server, or cloud server. Accordingly, in some embodiments, system 100 may be configured so that file processing device 120 may communicate via a network with an external storage device that may store large input file 106 and/or output file 108 such that file processing device 120 may read and/or write to the external storage device.

A network may be of any suitable type, including individual connections via the internet such as cellular or WiFi networks. In some embodiments, a network may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

A network may comprise any type of computer networking arrangement used to exchange data. For example, a network may be the Internet, a private data network, virtual private network using a public network, and/or other suitable connection(s) that enables components in file processing system 100 to send and receive information between the components of file processing system 100 or to and from computing devices that are external to file processing system 100. A network may also include a public switched telephone network ("PSTN") and/or a wireless network.

For ease of discussion, embodiments may be described in connection with processing a large file containing a plurality of employee records. It is to be understood, however, that disclosed embodiments are not limited to processing of large files of employee records but may be applied to many different types of large files containing various types of records. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
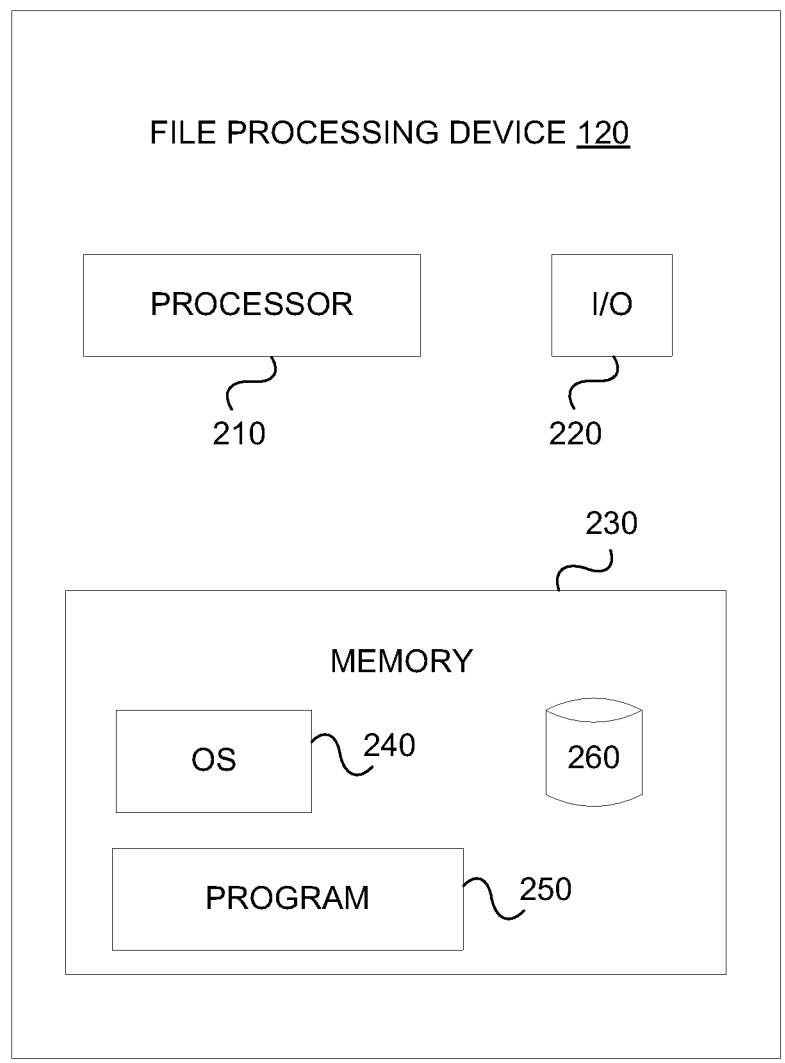
FIG. 2 is a component diagram of an exemplary large file processing device including exemplary virtual processing units.

An exemplary embodiment of file processing device 120 is shown in more detail in FIG. 2. Servers, databases, and other computing devices that may store large input file 106 and/or output file 108 may include many components that are similar to or even have the same capabilities as those described with respect to file processing device 120. As shown, file processing device 120 may include a processor 210, an input/output ("I/O") device 220, a memory 230 containing an operating system ("OS") 240 and a program 250. For example, file processing device 120 may be a single device or server or may be configured as a distributed computer system including multiple servers, devices, or computers that interoperate to perform one or more of the processes and functionalities associated with the disclosed embodiments. In some embodiments, file processing device 120 may further include a peripheral interface, a transceiver, a mobile network interface in communication with the processor 210, a bus configured to facilitate communication between the various components of the file processing device 120, and a power source configured to power one or more components of the file processing device 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

File processing device 120 may include one or more storage devices configured to store information used by processor 210 (or other components) to perform certain functions related to the disclosed embodiments. In some embodiments, file processing device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, file processing device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, file processing device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, file processing device 120 may include a virtual processing unit program 250 that may dynamically create a plurality of virtual processing units 130.

According to some embodiments, file processing device 120 may dynamically create a plurality of virtual processing units 130 that may be used to process a large input file 106. For example, in some embodiments, each virtual processing unit of the plurality of virtual processing units 130 may process a different portion of the large input file 106. Accordingly, the plurality of virtual processing units 130 may perform processing in parallel to one another to more quickly process the large input file 106. In some embodiments, virtual processing units 130 may be dynamically created based on focus values determined by the system 100, as described in further detail below. Each of virtual processing unit 130 may be or include a virtual machine or a container, such as a Linux container (which may be referred to as an "LXC container"), that may operate in isolation from one another such that a failure of one virtual processing unit 131 will not impact the processing performed by another virtual processing unit 132. A Linux container is an operating-system-level virtualization method for running multiple isolated Linux systems ("containers") on a control host using a single Linux kernel. A Linux container, such as, for example, Docker, provides an environment as a service by using most of the drivers of the host operating system. The host system may utilize an autoscaling process to spin up multiple instances of a given Linux container. According to some embodiments, each of virtual processing units 130 may be deleted after completing processing of its portion of the large input file 106. Thus, use of the virtual processing units 130 by the file processing device 120 allow for faster processing of a large input file 106, while also enabling file processing device 120 to better optimize its use of resources by dynamically deleting virtual processing units 130 that become idle. Further the virtual processing units 130 may be horizontally scaled to allow greater flexibility in the amount of processing capability available in the system 100.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable file processing device 120 to perform one or more of the processes and functionalities associated with the disclosed embodiments.

File processing device 120 may also be communicatively connected to one or more memory devices (e.g., databases) locally or through a network. The remote memory devices may be configured to store information and may be accessed and/or managed by file processing device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

File processing device 120 may also include one or more I/O devices 220 that may comprise one or more interfaces for receiving signals or input from devices and providing signals or output to one or more devices that allow data to be received and/or transmitted by file processing device 120. For example, file processing device 120 may include interface components, which may provide interfaces to one or more input devices, such as one or more keyboards, mouse devices, touch screens, track pads, trackballs, scroll wheels, digital cameras, microphones, sensors, and the like, that enable file processing device 120 to receive data from one or more users.

In exemplary embodiments of the disclosed technology, file processing device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While file processing device 120 and virtual processing units 130 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of file processing device 120 and virtual processing units 130 may include a greater or lesser number of components than those illustrated.

Figure 3B:
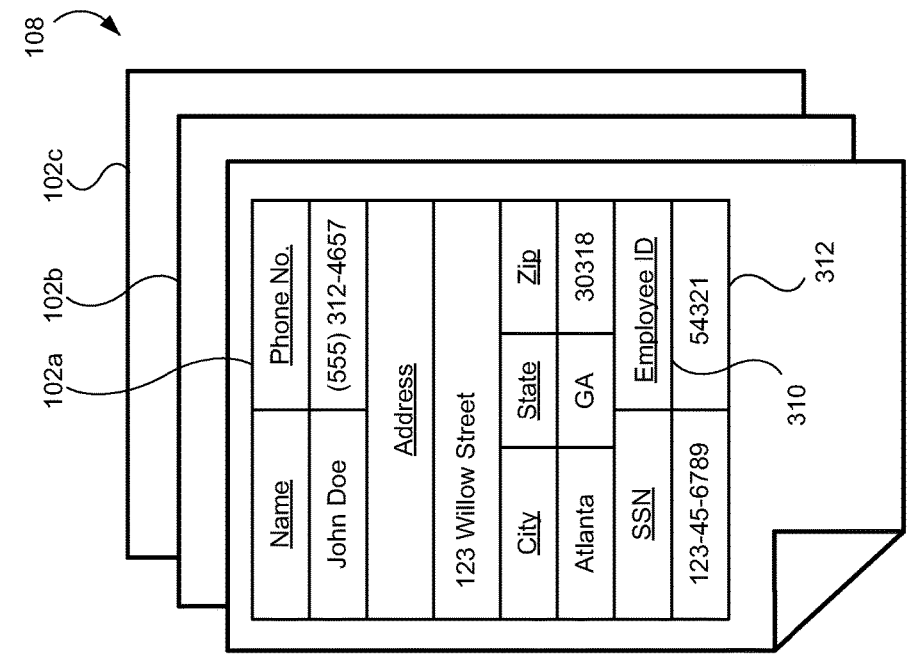
FIG. 3B is an exemplary large file having a plurality of records that have been modified by the large file processing system to add a new data field according to an example embodiment.
Figure 3A:
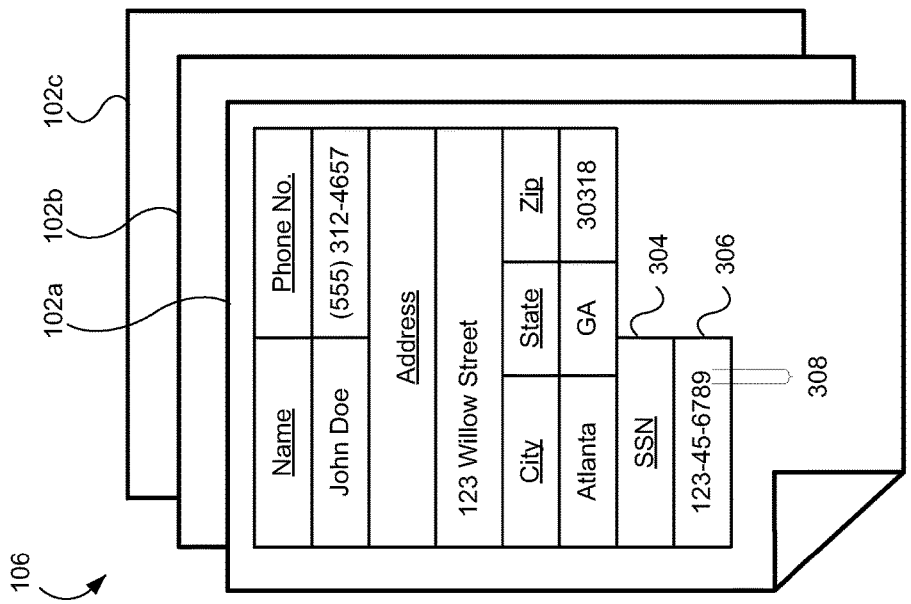
FIG. 3A is an exemplary large file having a plurality of records.

FIGS. 3A and 3B illustrate an exemplary large input file 106 and an output file 108, respectively. According to some embodiments, a large input file 106 and/or output file 108 may be any input file (such as a fixed length file or comma separated files), a database file, a table, a spreadsheet or any other type of file used to store data in an organized fashion. Although the techniques disclosed herein may be used to process any size of file, the techniques may be particularly useful in processing files that are 16 GB (e.g., more than approximately six million records) or larger. In some embodiments, a file may be considered to be a large file if it has a file size of greater than 1 GB or has more than one million records. According to some embodiments, a large input file 106 may include a plurality of records 102a, 102b, 102c. Although only three records 102a, 102b, 102c, are shown in FIG. 3A, it should be understood that a large input file 106 may contain any number of records and the three depicted are merely illustrative. In some embodiments, each record may comprise a plurality of fields, such as, for example, fields denoting a person's name, phone number, address, city, state, zip code, and social security number (SSN). A field may be a location that data may be stored or displayed. It should be understood that the fields presented herein are merely exemplary, and any number of different fields and field types may be included in a record 102a of a large input file 106. A common field may be a field that is common to multiple records of the plurality of records of a large input file 106. According to some embodiments, a common field may store an identification value, such as a social security number. As stated above, each field may store or display data or information that is part of the associated record. For example, as shown in FIG. 3A, the SSN title field 304 may display the type of data that may be stored in a SSN field 306 that is associated with the SSN title field 304. In some embodiments, a field may be associated with a data format such that that data entered into the field must comport with the associated data format. For example, a data format associated with the SSN field 306 may be a nine digit number (which may or may not include hyphens as shown in FIG. 3A). Accordingly, in some embodiments, the SSN field 306 may only store a nine digit number or a null (indicating that nothing has been entered in the SSN field 306). A data format may be a sequence of a specified number of characters (each character associated with a character position in the sequence) having specified data types. A field (e.g., SSN field 306) may be associated with a data format that may define the type of data that may be entered into or stored by the field. For example, a data format may have a specified number of character positions and each character position may be associated with a particular data type that specifies that type of data that may be entered at that position. According to some embodiments, a data type may represent a set of possible data entries for a particular character position associated with the data type. For example, a character or character position having a number data type may mean that the data entered at that position in a field must be a number (e.g., one of a number from 0 to 9). Data types may include, for example but without limitation, letters, numbers, alphanumeric characters, integers, binary numbers, base ten numbers, ASCII values, hexadecimal values, or any other predefined set of values, characters, and/or symbols that may be stored in a field of a record. For example, if a particular character position of a data format has a letter data format, it may mean that that character position can only be one of 26 possible letters (i.e., A to Z). Likewise, if a particular character position of a data format has a letter data format, it may mean that that character position can only be one of 10 possible numbers (i.e., 0 to 9). According to some embodiments, data types may be customizable so that a particular data type may include a set of any combination of values, characters, or symbols indicated by a user.

According to some embodiments, a social security number data format may be a sequence of nine characters, where each of the characters has a number data type (i.e., each of the nine characters must be a number). In some embodiments, a license plate data format may be a sequence of seven alphanumeric characters. In some embodiments, a license plate data format may be a sequence of seven characters, wherein the first three characters have a letter data type (i.e., each character must be a letter) and the last four characters have a number data type (i.e., each character must be a number). According to some embodiments, a name data format may be a sequence of characters having a predetermined maximum length, where each character of the sequence has a letter data type that is one of a letter or a null (i.e., each character of the sequence must either be a letter or a blank space). The aforementioned data formats are illustrative only, and it should be understood that any number of different data formats may be used by large file processing system 100. Further, data formats may be further defined using rules that may specify, for example, that particular characters in a sequence having a letter data type must be capital letters, lower case letters, or that they can be either. Further, data formats may be modified to include or exclude additional characters or symbols.

As described in further detail below, in some embodiments, file processing device 120 may determine a plurality of focus values that may be used to generate a number of virtual processing units for processing of a large input file 106. According to some embodiments, a plurality of focus values may be determined based on a data format of a common field of the plurality of records 102a, 102b, 102c, in a large data file 106. For example, in some embodiments, SSN field 306 may be a common field that stores an identification value (i.e., a social security number), having a data format that limits the data stored by the field to that of a nine digit number. The file processing device 120 may determine a plurality of focus values based on the nine digit data format of the SSN field 306. As described in further detail below, this determination may be made using a seed portion that identifies a particular portion of the data format to be used in generating an associated plurality of focus values. For example, a seed portion 308 may be the last character of a nine digit data format of the SSN field 306. Because the last character of the nine digit data format of the SSN field 306 is a number that can be any number from zero to nine, file processing device 120 may determine a plurality of ten focus values corresponding to the numbers zero through nine. According to some embodiments, the plurality of focus values may be used to divide up all of the records having the common field into a number of sub-groups. For example, in some embodiments, focus values determined from a SSN field 306 may correspond to the last digit of the nine digit data format of the SSN, thereby enabling the records to be divided into ten sub-groups (i.e., sub-groups of records having SSN's ending in each number of 0 through 9). Accordingly, as shown in FIG. 3A, seed portion 308 may identify a portion of a data format (e.g., the last digit of a SSN), and the plurality of focus values may represent possible values for the identified portion of the data format. So, for the seed portion 308 shown in FIG. 3A, the corresponding plurality of focus values may be numbers 0 through 9. In some embodiments, file processing device 120 may determine focus values from a seed portion of the data format of the SSN field 306 that identifies the last two digits of the nine digit data format of the nine digit SSN, thereby enabling the records to be divided into one hundred sub-groups (i.e., sub-groups of records having SSN's ending in each number of 00 through 99). In some embodiments, the plurality of focus values may be associated with one or more particular positions (which may be referred to as character positions or characters) of the data format (e.g., the position may be the first character of the data format or the last character of the data format), for example, based on the portion of the data format identified by a seed portion 308. Although the example described above relates to focus values being determined based on a data format corresponding to a SSN data format, it should be understood that focus values may be determined based on any data format. For example, a name field may have a data format that specifies that data in that field may only comprise letters from A to Z (i.e., the data format specifies a sequence of characters that all have a data type corresponding to letters of the alphabet), in which case, file processing device 120 may determine that for each character in the name field data format, there may be a plurality of 26 focus values that correspond to each letter of the alphabet. Further, file processing device 120 may associate (e.g., based on an associated seed portion) these 26 focus values with the first position of the data format corresponding to the name field (i.e., the first letter of the name in the name field). In this instance, the plurality of records may be divided into 26 sub-groups based on the first letter of the name in the name field. In another example, the last two characters of the name field may be identified as the seed portion for determining the plurality of focus values, in which case, file processing device 120 may determine that there are 676 (i.e., 26 multiplied by 26) focus values that comprise every possible combination of two letters. In some embodiments, a focus value may be a combination of one or more letters, numbers, or other data types. For example, if a seed portion corresponds to two characters of a license plate where each character could be either a letter or a number (i.e., each character could be one of 36 possible letters or numbers), than file processing device 120 may determine that there are a plurality of 1,296 (i.e., 36 multiplied by 36) focus values and 1,296 corresponding sub-groups. As shown by these examples, it should be understood that file processing device 120 may determine any number of focus values based on the underlying data format the focus values are being determined in association with, and that when there are more focus values, the plurality of records 102a, 120b, 102c, may be broken into a greater number of sub-groups.

FIG. 3B illustrates an exemplary output file 108. According to some embodiments, an output file 108 may comprise substantially the same data records as the large input file 106, but may differ in that some data may have been added, modified, or deleted by virtue of the processing performed by file processing device 120 on large input file 106. For example, as shown in FIG. 3B, a data record 102a of an output file 108 may include a newly added employee ID title field 310 and an employee ID field 312. According to some embodiments, these new fields may be added to a particular record by a virtual processing unit 131 associated with the focus value that is associated with the record. For example, a virtual processing unit 131 may be associated with a focus value of "9 in the last character of the SSN field" and may process all records having a "9" as the last character of the identification value in the SSN field 306. In this way, a plurality of virtual processing units 130 may quickly process portions of a large input file 106 in parallel in order to generate an output file 108 that has been modified in some way. Further, after a particular virtual processing unit 130 has completed its processing task, it may be deleted by file processing device 120, thereby freeing up memory previously used by the deleted virtual processing unit 130 and allowing the system to operate more efficiently.

Figure 4:
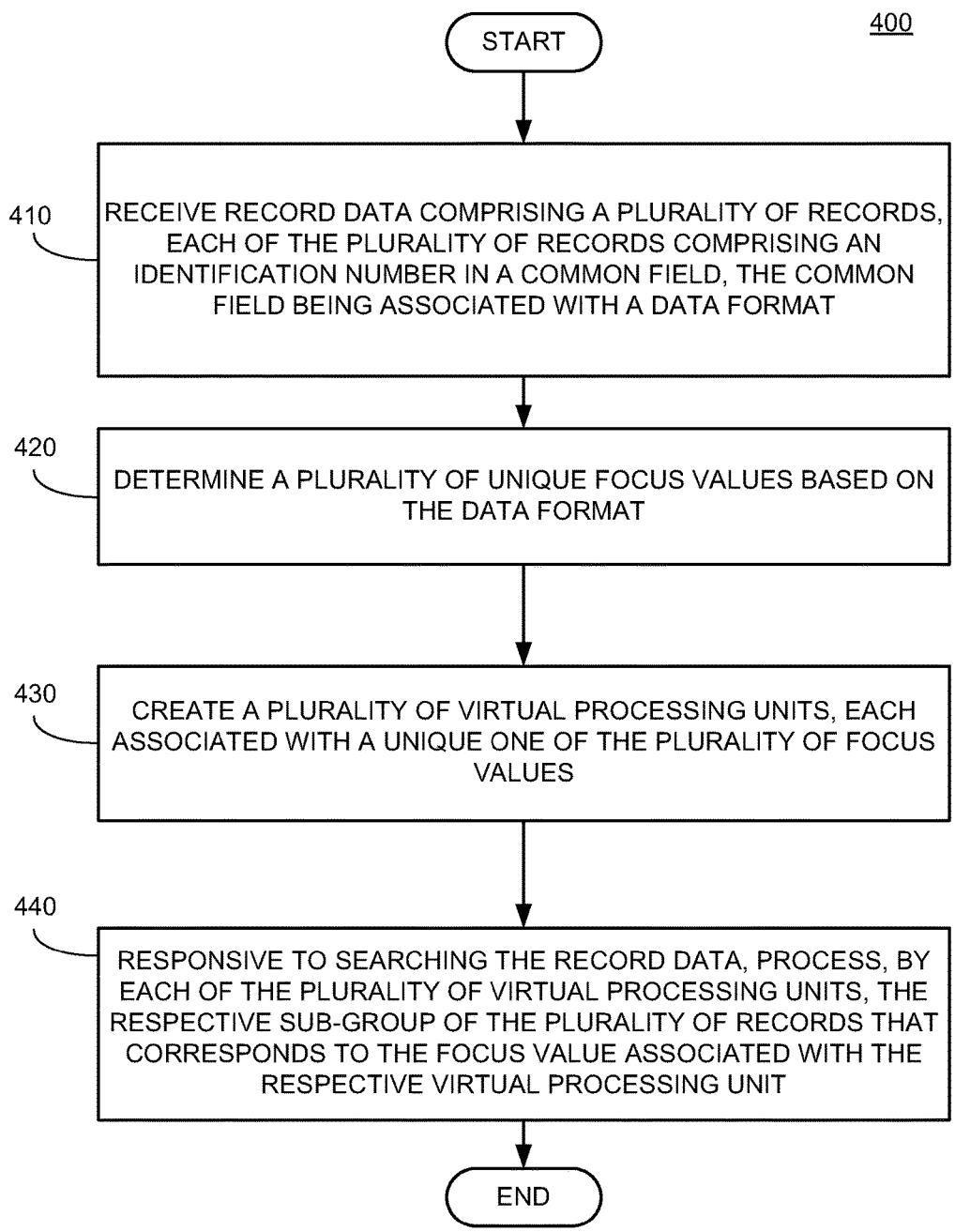
FIG. 4 is a flowchart of an exemplary system for processing a large file.

FIG. 4 shows a flowchart of an exemplary method 400 for processing a large file. Method 400 may be performed by file processing device 120.

In block 410, the system may receive (e.g., via file processing device 120) record data comprising a plurality of records. According to some embodiments record data may be, for example, a large file (e.g., large input file 106), such as a database file, a table, a spreadsheet, or any input file such as a fixed length file or a comma separated file. In some embodiments, file processing device 120 may receive record data from a local data storage. In some embodiments, file processing device 120 may receive record data from a remote storage device via a network. According to some embodiments, each of the plurality of records may comprise a number of fields for storing or displaying data and may further comprise an identification value in a common field (i.e., a field that is common to a plurality of records). For example, each of the plurality of records may include a field for storing an identification value, such as a social security number (the "SSN field"). In some embodiments, the common field may be associated with a data format. For example, the SSN field may be associated with a data format that specifies that data stored in the SSN field must comprise a nine digit number (that may or may not include dashes).

In block 420, the system may determine a plurality of focus values based on the data format associated with the common field. In some embodiments, each of the plurality of focus values may be unique from one another. The system may determine the plurality of focus values by selecting a specified portion of the data format (e.g., the last two numbers of a nine digit data format) and generating the plurality of focus values to represent every possible combination of values that may satisfy that portion of the data format. The portion of the data format selected to be used to create the focus values in this manner may be referred to as the "seed portion." For example, if the data format is a nine digit number, the focus values may be based on seed portion that is one digit of the nine digit number (e.g., the last digit of the nine digit number), so that the system may generate ten focus values (i.e., 0 through 9). In another example, the system may determine that the focus values may be based on a seed portion that is two digits of the nine digit number (e.g., the last two digits of the nine digit number), so that they system may generate 100 focus values (i.e., 00 through 99). According to some embodiments, the seed portion of the data format may include a data type (i.e., number, letter, alphanumeric, binary, etc.) and the position of data (e.g., the first number of a SSN, or the last letter of a name) within the data type. As previously mentioned, the plurality of focus values may represent every possible value for the selected seed portion of the data format. For example, there may be 10 focus values that correspond to a seed portion that represents a one digit number, there may 100 focus values that correspond to a seed portion that represents a two digit number, there may be 26 focus values that correspond to a seed portion that represents a letter, there may be 260 focus values that correspond to a seed portion that represents a combination of a number and a letter, and so on.

In some embodiments, the system may select a seed portion that is a single digit (e.g., the last digit) of a data type associated with a common field for storing an identification value, which may be referred to as a seed portion of a first order of magnitude (e.g., a single numerical digit, a single letter, a single alphanumeric character or the like). In some embodiments, the system may select a seed portion that is two digits of a data type associated with a common field for storing an identification value, which may be referred to as a seed portion of a second order of magnitude (e.g., a pair of numerical digits, a pair of letters, a pair of alphanumeric characters, or the like). It will be understood that as the order of magnitude of the seed portion rises, the number of the plurality of focus values may rise exponentially. According to some embodiments, the system may select the magnitude of the seed portion (i.e., whether the seed portion is one digit, two digits, or more) based on the size of the record data, the number of records, or the throughput of processing the records. For example, the system may default to using a seed portion of a first order of magnitude. But, if the system determines that the size of the record data exceeds a predetermined threshold size, the system may then use a seed portion of a second order or magnitude or higher in order to determine the plurality of focus values. In some embodiments, the magnitude of the seed portion may be determined in response to a user input received by file processing device 120. For example, a user may input a selection of a portion of a data format (e.g., the user may select the last digit of a nine digit social security number data format) to be used as the seed portion that is used to create a plurality of focus values.

According to some embodiments, each of the plurality of focus values may correspond to a sub-group of the plurality of records. For example, in the case where they system uses a seed value corresponding to the last digit of a social security number data format, the system may determine that there are 10 focus values (i.e., 0-9), and each one of those focus values may correspond to a sub-group of the plurality of records. For example, focus value 0 may correspond to a sub-group of records having a social security number ending in "0," focus value 1 may correspond to a sub-group of records having a social security number ending in "1," and so on. In this way, the plurality of records may be divided into sub-groups, with each sub-group corresponding to a particular focus value.

In block 430, the system may create a plurality of virtual processing units 130. According to some embodiments, each virtual processing unit 130 may be associated with a unique one of the plurality of focus values. Accordingly, in some embodiments, each of the virtual processing units 130 may correspond to a particular sub-group of the plurality of records that is associated with the same focus value as the virtual processing unit. As described above, a virtual processing unit 131 may comprise a virtual machine or a container, such as a Linux container.

In block 440, the system may process, by each of the plurality of virtual processing units 130, the respective sub-group of the plurality of records that corresponds to the focus value associated with the respective virtual processing unit 130. In some embodiments, this processing may be performed in response to searching the record data. For example, the system may search the record data to identify each record that is part of a particular sub-group by determining whether each record contains data in a common field that corresponds to the focus value associated with the sub-group. For example, a virtual processing unit 131 that is associated with, for example, a focus value of "last digit of SSN is 9" may process all records containing a social security number in the SSN field that ends in 9. In some embodiments, sub-groups may be identified by in response to a single search of the record data performed by the system. In some embodiments, each virtual processing unit 130 may independently search or read the record data to identify records that contain its respective focus value.

According to some embodiments, each virtual processing unit 130 may process its respective sub-group of records in parallel with the other virtual processing units 130. Thus, if there are 10 focus values, there may be 10 virtual processing units 130 that may simultaneously process 10 different records. However in some instances it may be possible that large input file 106 includes no records that correspond to a particular focus value (e.g., the input file has no records that have a social security number ending in the number "9"), in which case, the virtual processing unit 130 corresponding to that focus value may be deleted after searching large input file 106 and failing to identify any records corresponding to its associated focus value. Accordingly, the absence of a sub-group of records associated with a particular virtual processing unit 130 will not corrupt or otherwise negatively impact the processing of large input file 106. A virtual processing unit 130 may process a record by reading the record from, for example, a large input file 106, and outputting an output record for inclusion in, for example, an output file 108. A virtual processing unit 130 may modify, delete, or add data to a record in the course of processing the record. Because each virtual processing unit 130 performs its processing of the large input file 106 in isolation from the others, if a particular virtual processing unit 130 fails or encounters an error during processing, it may simply restart its processing of the large input file 106 without interrupting the processing being performed by the other virtual processing units 130. In some embodiments, the system may remove duplicate records in the course of processing the record data, by for example, comparing records to determine if there is more than one record that has the same social security number and deleting the duplicate records before generating an output file 108. According to some embodiments, a virtual processing unit 130 may be deleted by the system after it has finished processing its sub-group of records.

Figure 5:
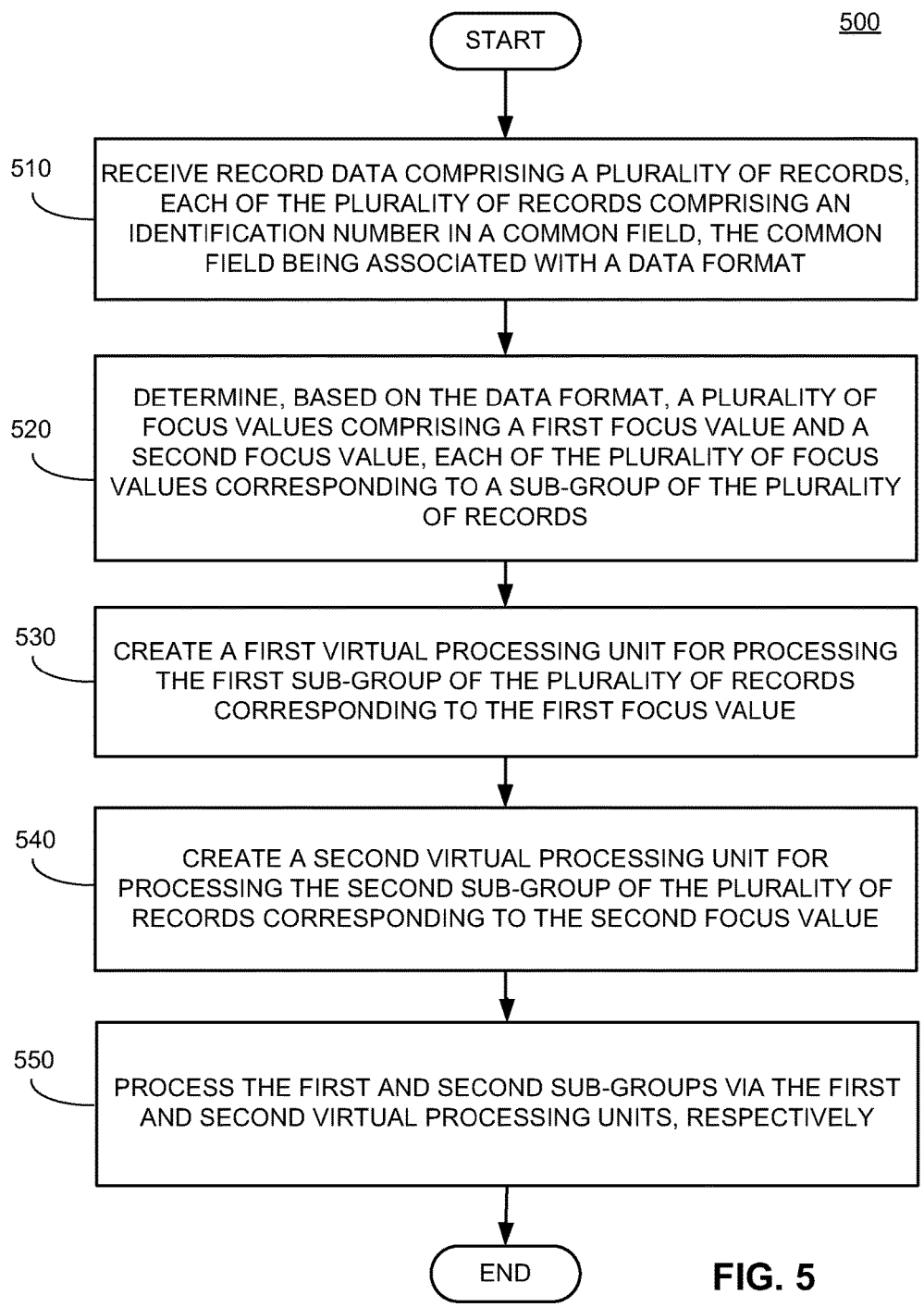
FIG. 5 is a flowchart of another exemplary system for processing a large file.

FIG. 5 shows a flowchart of another exemplary method 500 for processing a large file. Method 500 may be performed by file processing device 120.

In block 510, the system may receive record data comprising a plurality of records in a manner substantially similar to that described with respect to block 410 above.

In block 520, the system may determine a plurality of focus values based on the data format associated with a common field in a manner substantially similar to that described with respect to block 420 above. In some embodiments, the plurality of focus values may comprise at least a first focus value and a second focus value. According to some embodiments, each of the plurality of focus values may correspond to a sub-group of the plurality of records such that the first focus value may correspond to a first sub-group of the plurality of records and the second focus value may correspond to a second sub-group of the plurality of records.

In block 530, the system may create a first virtual processing unit 131 in a manner substantially similar to that described with respect to block 430 above. According to some embodiments, the first virtual processing unit 131 may be created for processing the first sub-group of the plurality of records corresponding to the first focus value. For example, a first virtual processing unit 131 may be associated with a focus value of "last digit of SSN is 1," and may be created to process a sub-group of records that include social security numbers ending in the number 1.

In block 540, the system may create a second virtual processing unit 132 in a manner substantially similar to that described with respect to block 430 above. According to some embodiments, the second virtual processing unit 132 may be created for processing the second sub-group of the plurality of records corresponding to the second focus value. For example, a second virtual processing unit 132 may be associated with a focus value of "last digit of SSN is 2," and may be created to process a sub-group of records that include social security numbers ending in the number 2.

In block 550, the system may process the first and second sub-groups of the plurality of records via the first and second virtual processing units 131, 132, respectively, in a manner substantially similar to that described above with respect to block 440. Although method 500 describes the creation and use of two virtual processing units 130, it should be understood that any number of virtual processing units 130 may be created to process respective sub-groups of records, where the number of virtual processing units 130 corresponds to the number of focus values determined by the system. In some embodiments, the system may determine the number of focus values based on the size of the large input file. For example, the system may default to using a seed portion of a first order of magnitude (e.g., a single numerical digit, a single letter, a single alphanumeric character or the like) to generate focus values, but if the system determines that the large file (e.g., large input file 106) is larger than a predetermined threshold size, then the system may use a seed portion of a second order of magnitude (e.g., a pair of numerical digits, a pair of letters, a pair of alphanumeric characters, or the like) to determine the number of focus values. In some embodiments, the system may determine the number of focus values in response to a user input. For example, a user may input a selection of a seed portion that the system may use to generate focus values.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following exemplary use case describes an example of a typical user flow pattern. They are intended solely for explanatory purposes and not in limitation. A financial services provider may have a large file that includes a large number of records that the financial services provider wants to process in some way. For example, each record of the large file may include information about an employee such as the employee's name, address, phone number, social security number, job title, pay rate, office location, and hire date. The financial services provider may decide that it wants to create (or update) an employee ID number for each employee, and so each employee record will have to be modified to add a new field to the record that contains the employee ID number. Processing the large file using conventional processing methods is likely to take a very long time because the database is so large. However, the present system may process the large file much faster than conventional methods. First, the large file is read or received by the system (e.g., via the large file processing device 120). The system (e.g., via large file processing device 120) may then create a number of virtual processing units (e.g., virtual processing units 130) to process the large file in parallel by assigning each virtual processing unit to process a sub-group of the records in the large file. The records can be virtually divided into sub-groups (e.g., via large file processing device 120) based on a specified portion of the social security number entry of each record. For example, a first virtual processing unit may process all records having a social security number ending in "1," a second virtual processing unit may process all records having a social security number ending in "2," and so on. In addition to the processing speed gained by the use of multiple virtual processing units, because the virtual processing units operate in isolation from one another, if one of them fails or encounters an error, it simply restarts the processing of its sub-group of records without impacting the processing performed by the other virtual processing units. As each virtual processing unit processes its respective sub-group, it appends each record of the sub-group with a new field that includes an employee ID number. Once a particular virtual processing unit has completed processing, the system (e.g., via large file processing device 120) deletes the virtual processing unit, thereby freeing up resources of the system to perform other tasks. After the system is finished processing the large file, it outputs an updated file where all records of the large file have been modified to include employee ID numbers.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A system for processing a large file, comprising:
one or more processors; and
a memory in communication with the one or more processors and storing instructions that, when executed by the one or more processors, are configured to cause the system to:
receive record data comprising a plurality of records, each of the plurality of records comprising an identification value in a common field, the common field having a data format comprising a sequence of characters and each of the identification values corresponding to a license plate number;
determine, based on the data format, a plurality of focus values comprising at least a first focus value and a second focus value, each of the plurality of focus values corresponding to a sub-group of the plurality of records such that the first focus value corresponds to a first sub-group of the plurality of records and the second focus value corresponds to a second sub-group of the plurality of records, wherein the plurality of focus values comprise a set of 260 unique two-character sequences where each unique two-character sequence comprises a letter followed by a number with the plurality of focus values corresponding to a specified portion of the sequence of characters in the data format;
create a first virtual processing unit for processing the first sub-group of the plurality of records corresponding to the first focus value;
create a second virtual processing unit for processing the second sub-group of the plurality of records corresponding to the second focus value; and
process the first and second sub-groups of the plurality of records via the first and second virtual processing units, respectively.

2. The system of claim 1, wherein the data format comprises a sequence of seven characters, wherein a first, second, and third character of the sequence are associated with a letter data type and a fourth, fifth, sixth, and seventh character of the sequence are associated with a number data type.

3. The system of claim 2, wherein the specified portion of the data format is the third and fourth characters of the sequence of seven characters.

* * * * *